United States Patent [19]

Koshimo

[11] Patent Number: 5,020,646
[45] Date of Patent: Jun. 4, 1991

[54] TORQUE CONVERTER DEVICE
[75] Inventor: Masahiko Koshimo, Osaka, Japan
[73] Assignee: Kabushiki Kaisha Daikin Seisakusho, Osaka, Japan
[21] Appl. No.: 423,470
[22] PCT Filed: Jan. 19, 1989
[86] PCT No.: PCT/JP89/00047
   § 371 Date: Oct. 2, 1989
   § 102(e) Date: Oct. 2, 1989
[87] PCT Pub. No.: WO89/07725
   PCT Pub. Date: Aug. 24, 1989
[30] Foreign Application Priority Data
   Feb. 10, 1988 [JP] Japan .................. 63-29899
[51] Int. Cl.⁵ ............................. F16H 45/00
[52] U.S. Cl. ................... 192/3.25; 192/3.3; 192/3.33
[58] Field of Search ............. 192/3.21, 3.25, 3.26, 192/3.29, 3.3, 3.33

[56] References Cited
U.S. PATENT DOCUMENTS
2,355,709 8/1944 Dodge ..................... 192/3.25
4,673,071 6/1987 Moroto et al. ............ 192/3.21

FOREIGN PATENT DOCUMENTS
2535002 4/1984 France ................... 192/3.25
61-189330 8/1986 Japan .

Primary Examiner—Richard Lorence
Attorney, Agent, or Firm—Armstrong, Nikaido, Marmelstein, Kubovcik & Murray

[57] ABSTRACT

A torque converter device having an impeller linked to the outer circumference of the front cover, a turbine located between the front cover and the impeller, a directly coupled clutch, for engagement with an inner surface of the front cover through a friction linkage, position between the outer circumferential part of the turbine and the outer circumferential part of the front cover, an output clutch disposed between the inner circumferential part of the turbine and the inner circumferential part of the front cover and in a space filled with working fluid radially inside the directly coupled clutch, the output clutch being composed of multidisc friction clutch, the output unit of the directly coupled clutch and the output unit of the turbine being linked to the input unit of the output clutch, and the output unit of the output clutch being linked to an output shaft.

3 Claims, 1 Drawing Sheet

TORQUE CONVERTER DEVICE

BACKGROUND OF THE INVENTION

1. Field of the Invention

This invention relates to a torque converter device used in automobiles and others, and more particularly, to a torque converter device having a friction clutch attached to the output portion of a torque converter with a directly coupled clutch for a semiautomatic type or fully automatic type vehicle and disposed at the input side of a synchromesh type speed change gear or the like.

2. Description of the Prior Art

Prior hereto in the torque converter device of the type mentioned above, the input block of a torque converter, with a directly coupled clutch, is coupled with the engine, and the output shaft of the torque converter is coupled with the input block of the synchromesh speed change gear by way of an output side friction clutch (an output clutch).

In such structure, when the vehicle starts up, a smooth starting action is realized by the torque converter, and by operating the directly coupled the output clutch while traveling, it is possible to operate in a state of high transmission efficiency, when changing the speed (changing the speed while traveling or changing over the speed change gear when stopping), a smooth speed change operation is effected by temporarily disengaging the output clutch.

In the conventional structure, however, the output clutch is a dry single-disc clutch, and is disposed between the torque converter and the speed change gear and arranged in the axial direction. The following problems are involved In the dry clutch, because the outside diameter is large, the entire torque converter device becomes larger in size. Moreover, because the torque converter, output clutch and speed change gear are arranged axially in a row, the axial length of the entire device becomes extended. Further, in the dry clutch, when used for a long time, the friction facing becomes worn and must be replaced.

The present invention is intended to solve these problems.

SUMMARY OF THE INVENTION

To achieve the above object, in this invention, an impeller is linked to the outer circumference of the front cover which is the input unit, a turbine is located between the front cover and the impeller, a directly coupled clutch, which can be linked to the inner surface of the front cover through a friction linkage part, is arranged between the outer circumferential part of the turbine and the outer circumferential part of the front cover, an output clutch is disposed between the inner circumferential part of the turbine and the inner circumferential part of the front cover and in a space filled with working fluid at the inside, in the radial direction, of the directly coupled clutch. The output clutch is composed of multi-disc friction clutch. The output of the directly coupled clutch and the output of the turbine are linked to the input unit of the output clutch, and the output of the output clutch is linked to an output shaft.

In this construction, while the directly coupled clutch is connected, the torque is transmitted from the front cover to the input of the output clutch through the directly coupled clutch. While the directly coupled clutch is disengaged, torque is transmitted from the front cover to the input of the output clutch by way of the impeller, working fluid, and the torque converter. The torque transmitted to the input of the output clutch is transmitted to the output of the output clutch through the friction linkage part of such output clutch, while such output clutch is in connected state, and from the output unit to the output shaft.

When changing the speed in the speed change gear to which the output shaft is linked, the output clutch is disengaged. In such disengaged state, power tends to be transmitted from the input side friction disc (drive plate) to the output side friction disc (driven plate) through the working fluid between such discs. However, because the entire output clutch is disposed at the inner periphery side of the directly coupled clutch and is small in diameter, the torque transmitted through the working fluid is so small as to be practically ignored. Hence, the speed change operation may be securely and lightly effected in the subsequent synchromesh type speed change gear.

DETAILED DESCRIPTION OF THE PREFERRED EMBODIMENT

Figure 1:
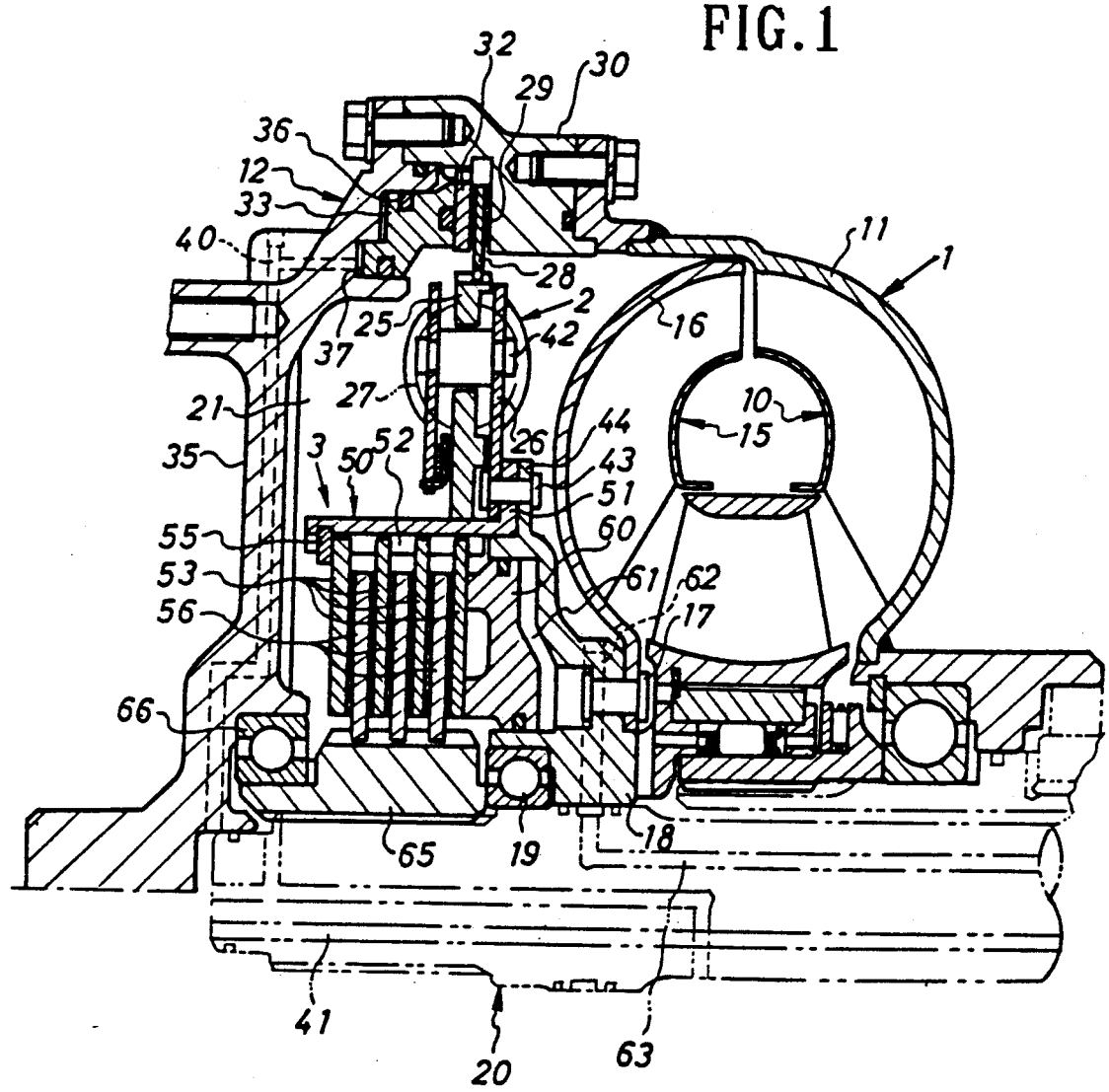
FIG. 1 is a partial sectional view of an embodiment of the invention.

In FIG. 1, the illustrated torque converter comprises a torque converter 1, a directly coupled clutch 2, and an output clutch 3.

The torque converter 1 has the outer circumference of a shell 11 of its impeller 10 fixed on a front cover assembly 12. The front cover assembly 12 composes an input unit of an entire torque converter device, and is linked with an output unit of an engine which is not shown in the drawing. A turbine 15 of the torque converter 1 is opposite to the impeller 10 in the axial direction and have shell 16. The inner periphery of turbine shell 16 is fixed to a turbine hub 18 by a rivet 17. The turbine hub 18 is rotatably supported on the outer circumference of an output shaft 20 through a bearing 19.

Between the turbine 15 and the front cover assembly 12, a gap, wide in the axial direction and having an internal space 21, is formed. Directly coupled clutch 2 is disposed on the outer circumference of the internal space 21. The clutch disc of the directly coupled clutch 2 comprises an annular input disc 25, a pair of output discs 26 disposed at both sides thereof in the axial direction, and a damper spring 27 for linking the input disc 25 and output discs 26 in the circumferential direction.

At the outer peripheral edge of the input disc 25, the inner circumference of an annular support disc 28 is mounted in a state not allowed to rotate relative to input disc 25 but allowed to move in the axial direction. At both sides of the support disc 28, friction facings 29 are adhered. The friction facings 29 positioned at the side of the torque converter 1 with respect to the support discs 28 are opposite to the annular end face of an outer circumferential member 30 of the front cover assembly 12.

The opposite side friction facing 29 confronts a piston 33 by way of an annular pressure plate 32. The pressure plate 32 has its outer circumference linked to the inner circumference of the outer circumferential member 30 through a spline. The piston 33 has its outer circumference and inner circumference slidably fitted to the groove 36 provided inside the outer circumference of the front cover main body 35 through a seal. The front cover main body 35 is a member for composing the end wall portion of the front cover assembly 12, and the outer circumferential member 30 is bolted to the outer circumference of the front cover main body 35. An oil pressure chamber 37 for the piston 33 is formed between the bottom of the groove 36 and the end face of its confronting piston 33, and is connected to a hydraulic control unit (not shown) through a series of oil paths 40, 41. The oil path 40 is formed inside the front cover main body 35, and the oil path 41 is formed inside the output shaft 20.

In this composition, by supplying an oil pressure to the oil pressure chamber 37 through the oil paths 40, 41 from the hydraulic control unit, the directly coupled clutch 2 is connected. Piston 33 presses the friction facing 29 against the outer circumferential member 30 through the pressure plate 32, and torque is introduced from the outer circumferential plate 30 into the input disc 25 through the friction facing 29 and support plate 28, and is transmitted from the input disc 25 to the output discs 26 through the damper spring 27.

Output discs 26 are mutually fixed firmly to each other by means of a pin 42 in the axial direction. Of the two output discs 26, the one 26 closer to the turbine 15 has its inner periphery fixed to an outward flange 44 of the turbine hub 18 by means of a rivet 43 as described below.

An input member 50 of the output clutch 3 is disposed in the inner circumferential side of the inner space 21, between the inner circumferential part of the turbine 15 and the inner circumferential part of the front cover main body 35, at a position inside of the radial direction with respect to the directly coupled clutch 2. The input member 50 is tubular, is extended in the axial direction, and has an outward flange 51 integrally provided at the end portion of the turbine 15 side. The flange 51 is held between the inner circumferential part of the output discs 26 and the outer circumferential part of the flange 44, and is fixed integrally therewith by means of the rivet 43. The cylindrical outer circumferential surface of the input member 50 rotatably supports the input disc 25.

The input member 50 has a spline 52 in its inner circumference. Outer circumferential parts of plural drive plates 53 are linked to the spline 52 in a state capable of sliding only in the axial direction. A groove, to which a stopper 55, is fitted is provided in the end inner circumference of the front cover main body 35 side of the input member 50. The stopper 55 prevents the adjoining drive plates 53 from moving to the front cover main body 35 side.

Between each of two drive plates 53, annular driven plates 56 are disposed. On the surface of each driven plate 56, a friction facing, for pressing to the drive plate 53, is adhered. Between these plates 53, 56 and the turbine hub 18, an annular piston 60 is provided. The piston 60 is fitted into the annular recess or groove provided in the turbine hub 18, and its inner circumference and outer circumference are slidably fitted to the annular recess through seals. An oil pressure chamber 61 for the piston 60 is formed between the bottom of the annular recess and the end face of the piston 60, and is connected to a hydraulic control mechanism (not shown) through oil path 62 and oil path 63. The oil path 62 is disposed inside the turbine hub 18, and the oil path 63 is disposed inside the output shaft 20.

Inside the radial direction of the plates 53, 56 is disposed an output member 65 of the output clutch 3. The output member 65 is tubular, and the outer circumference of one end portion is supported to the inner circumferential part of the front cover main body 35 through a bearing 66. Splines are provided at the outer circumference and inner circumference of the output member 65. The inner circumferential spline of output member 65 is linked to a spline on the outer circumference of the output shaft 20, splines on the inner circumference of the driven plate 56 are linked to the outer circumferential spline on output member 65.

In output clutch 3, by pressurizing the oil pressure chamber 61, piston 60 engages drive plates 53 and driven plates 56 consequently, and consequently the output clutch 3 is engaged. Torque is transmitted from the input member 50 to the output member 65 by way of the drive plate 53 and driven plate 56, and further from the output member 65 to the output shaft 20. When the oil pressure to the oil pressure chamber 61 is released, the press-fitting force between the drive plate 53 and driven plate 56 is released, and the clutch is disengaged.

The inner space 21 is filled with working fluid, as is the inside of the impeller 10 and turbine 15. Therefore, even if the output clutch 3 is disengaged, as stated above, a slight torque is transmitted from the drive plates 53 to the driven plates 56 through the working fluid remaining between such plates. However, because the drive plates 53 and driven plates 56 are disposed at the inner circumferential side of the inner space 21, their effective radii are small. Furthermore, if there is a difference in the revolutions between the drive plate 53 and driven plate 56, the speed difference, in terms of distance between plate parts is small. Therefore, in the clutch disengaged state, the torque transmitted from the drive plates 53 to the driven plates 56 (the drag torque) is substantially as small and can be ignored.

This device is disposed at the input side of the synchromesh type speed change gear, and the unshown end portion of the output shaft 20 is linked to the input unit of the speed change gear. When such structure is applied in an automobile, the parts operate as follows.

In starting vehicle movement, the directly coupled clutch 2 is disengaged. In this state, power is transmitted through the torque converter 1, and a smooth starting of vehicle movement is effected. In the fixed running state, the directly coupled clutch 2 is engaged, and power is transmitted with minimum transmission loss. In these operating states, the output clutch 3 is maintained in the engaged state. Therefore, torque is transmitted from the turbine 15 or output discs 26 to the input member 50, and from the input member to the output shaft 20 as described herein.

In the speed change operation, the output clutch 3 is temporarily disengaged. In the disengaged state, as stated above, the drag torque is very small, and the transmission of power to the output shaft 20 through clutch 3 substantially cutoff completely. Therefore, in the subsequent synchromesh type speed change gear, the speed change operation can be effected securely and lightly.

Thus, according to this invention, because the output clutch 3 is located at the inner circumferential side of the directly coupled clutch 2, the dimensions of the entire torque converter device in the axial direction and diametral direction are decreased, and the entire structure may be reduced in size. Besides, the effective diameter of the output clutch 3 can be shortened, and the drag torque of the output clutch 3 can be reduced, and a torque converter device suited for combination with synchromesh speed change gear is provided. Furthermore, because the output clutch 3 is a wet clutch, wear of the friction facing may be effectively prevented.

In this invention, the output clutch 3 is composed of wet clutch, preventing wear of the facing, and, because of its structure and layout, as described herein, drag torque due to working fluid is decreased and a torque converter device suited for combination with synchromesh speed change gear is provided.

In the foregoing explanation, only the synchromesh speed change gear is mentioned, but recently stepless speed change gears have come to be used as the speed change gears for automobiles. In such speed change gears, it is desired to eliminate drag torque as far as possible when starting movement of the automobile or changing between forward and reverse directions. Therefore, the torque converter device of this invention may be also combined with such stepless speed change gears.

What is claimed is:

1. A torque converter device having an input unit comprising a front cover main body and an outer circumferential part, an impeller having a shell, an outer circumference of said shell being fastened to said outer circumferential part of said input unit, a turbine located axially between said front cover main body and said impeller, said turbine being fixed to a turbine hub, a directly coupled clutch for selectively coupling to said outer circumferential part of said front cover with said turbine hub, hydraulic piston means disposed in a groove provided in an outer circumferential portion of said front cover main body for engaging and disengaging said friction directly coupled clutch, an output clutch disposed axially between an inner circumferential part of said turbine and an inner circumferential part of said front cover main body in a space filled with working fluid radially inside of said directly coupled clutch, said output clutch being composed of a multidisc friction clutch and having an output unit and an input unit, an output disc of said directly coupled clutch and said turbine hub being linked to said input unit of said output clutch, and said output unit of said output clutch being linked to an output shaft.

2. A torque converter device according to claim 1, wherein said input unit of said output clutch is tubular, extends in the axial direction of said output clutch, and has a radially outwardly extending flange integrally formed at an end part adjacent to the turbine, said flange being held between an inner circumferential part of the output disc unit of said directly coupled clutch and a radial flange formed on the turbine hub and being integrally fixed therewith by means of a rivet.

3. A torque converter device according to claim 1, wherein a spline is provided on an inner circumference of said input of said output clutch, and outer circumferential parts of plural drive plates are slidably linked in the spline, and between each adjacent two of said drive plates, annular driven plates are disposed to be pressed therebetween, and between said drive and driven plates and said output unit of said turbine, a hydraulic piston mechanism is installed in order to mutually press said drive and driven plates, said driven plates being linked to the output unit of said output clutch.

* * * * *